United States Patent [19]

Leman et al.

[11] Patent Number: 4,652,210

[45] Date of Patent: Mar. 24, 1987

[54] DEVICE INCORPORATING RETRACTABLE STOPS FOR LIMITING THE FLAPPINGS OF THE BLADES OF THE MAIN ROTOR OF A ROTORCRAFT

[75] Inventors: Jean-Luc Leman, Aix en Provence; Robert J. Suzzi, Marseille, both of France

[73] Assignee: Societe Nationale Industrielle Aerospatiale, Paris, France

[21] Appl. No.: 648,213

[22] Filed: Sep. 7, 1984

[30] Foreign Application Priority Data

Sep. 8, 1983 [FR] France .................................. 83 14311

[51] Int. Cl.$^4$ ............................................... B64C 27/38
[52] U.S. Cl. .................... 416/140; 416/134 A; 416/141
[58] Field of Search ............... 416/140 A, 141, 134 A, 416/140 R, 107, 106

[56] References Cited

U.S. PATENT DOCUMENTS

| | | |
|---|---|---|
| 2,465,674 | 3/1949 | Crowell . |
| 2,614,640 | 10/1952 | Buivid . |
| 2,719,593 | 10/1955 | Alex . |
| 2,742,098 | 4/1956 | Jovanovich ................ 416/140 A X |
| 3,147,810 | 9/1964 | Mosinskis . |
| 3,533,713 | 10/1970 | Salmun .......................... 416/140 A |
| 3,778,189 | 12/1973 | Ferris ............................. 416/140 A |
| 3,853,426 | 12/1974 | Rybicki ......................... 416/140 A |
| 4,203,708 | 5/1980 | Rybicki ....................... 416/140 A X |
| 4,268,222 | 5/1981 | Bernard . |
| 4,289,448 | 9/1981 | Declerco et al. ............... 416/140 A |
| 4,304,525 | 12/1981 | Mouille ....................... 416/140 A X |
| 4,361,415 | 11/1982 | Aubry ......................... 416/140 A X |
| 4,368,006 | 1/1983 | Ferris et al. .................... 416/140 A |
| 4,504,193 | 3/1985 | Mouille ......................... 416/140 A |
| 4,551,067 | 11/1985 | Caramaschi et al. ........... 416/140 A |
| 4,556,365 | 12/1985 | Mouille et al. . |

FOREIGN PATENT DOCUMENTS

| | | | |
|---|---|---|---|
| 7525617 | 3/1976 | France ............................... 416/140 |
| 7824480 | 3/1981 | France ............................... 416/140 |
| 212105 | 2/1941 | Switzerland .................... 416/140 A |
| 2073121 | 10/1981 | United Kingdom ................. 416/140 |

Primary Examiner—Everette A. Powell, Jr.
Attorney, Agent, or Firm—Armstrong, Nikaido, Marmelstein & Kubovcik

[57] ABSTRACT

The invention relates to a device incorporating retractable stops for limiting the flappings of the blades of the main rotor of a rotorcraft. Each lower stop comprises a convex roller presenting a convex stop surface and bearing a weight at the end of an arm. By its convex roller, the lower stop is mounted to pivot about the pin for retaining the blade on the hub. On the ground, the bearing member is in contact with a lower bearing surface fast with the blade at the level of the pitch control lever, in order to limit the downward flappings of the blade. The lower stop pivots about the pin above the lower plate. The upward flappings of the blade may be limited by upper stops disposed substantially symmetrically below the upper plate. A second lower weight, returned by a spring, and engaging by a nose-shaped element in a notch in the rear of the bearing surface, acts as upper stop. The invention is more particularly applicable to equipping helicopters.

27 Claims, 17 Drawing Figures

DEVICE INCORPORATING RETRACTABLE STOPS FOR LIMITING THE FLAPPINGS OF THE BLADES OF THE MAIN ROTOR OF A ROTORCRAFT

The present invention relates to devices incorporating retractable stops for limiting the flappings of the blades of the main rotor of a rotorcraft at low or zero speeds of rotation of the rotor, and the invention relates more particularly to a device of this type for equipping a rotorcraft rotor having a hub comprising an upper plate and a lower plate, and coupled to the root of each blade of the rotor via at least one hinge device on which the flapping, drag and pitch-change axes of the corresponding blade intersect at one point, and which comprises one single spindle for connection to the plates and for retention of the corresponding blade on the hub.

When a helicopter rotor has stopped or is rotating at low speed, for example during spin-up of the rotor before take-off, or when the rotor slows down before it stops completely, after landing, the blade is, as is known, subjected only to centrifugal forces and to aerodynamic lift forces which are zero or much reduced, so that the resultant of these forces on each of the blades is less than the weight of the blade, with the result that the latter pivots downwardly about its flapping hinge. The weight of each blade therefore stresses the hinge device as well as that part of the hub on which this device is fixed and, in particular when the hinge device is constituted by a laminated spherical bearing, the weight of the blade tends to deform this laminated spherical bearing about the flapping axis. This may result in the end of one or more of the blades of such a rotor striking the stabilizer of the helicopter, its cabin or even possibly the ground, which may be translated by considerable damage, particularly when the rotor is rotating at low speed. Furthermore, the rotors of this type are often equipped with relatively flexible blades which, when the rotor stops or rotates at low speed, are very sensitive to gusts of wind. Now, such gusts of wind are particularly violent on certain floating or fixed off-shore platforms, particularly for off-shore oil prospection, on which such helicopters must land, and on ships equipped with a helicopter landing pad. It is obvious that the efforts of the wind on the blades which have stopped or rotate slowly further increase the risks of collisions between the ends of the blades and the parts of the helicopter or the platform or landing pad from which it operates.

For these reasons, a large number of devices incorporating retractable stops for limiting the flappings of helicopter rotor blades have already been proposed.

U.S. Pat. No. 2,614,640 in particular describes independent lower stops for the different blades of the main rotor of a helicoptor. Each independent lower stop is borne by a first lever, mounted to pivot about a substantially horizontal pin, fixed to the hub. On the lower part of this first lever are hinged two second levers, bearing lower weights and coupled respectively to the first lever via a spring. The arrangement of these elements is such that, when the rotor has stopped, the spring maintains each second lever in a virtually vertical position, in which it immobilizes the first lever, bearing the stop, in an upper position, where said stop may limit the downwash of the corresponding blade, whilst, when the rotor rotates at a sufficient speed, the centrifugal force applied to each weight, opposing the action of the spring, causes retraction of the second levers which consequently allow downward pivoting of the first lever, and retraction of the corresponding stop.

U.S. Pat. No. 2,719,593 also describes independent lower stops for the different blades of the main rotor of a helicopter. Each independent stop essentially comprises a bell crank lever of which the first arm forms a stop, and the second arm bears a weight. The lever is mounted to oscillate on a pivot fixed horizontally to the hub of the rotor. A spring acts on the pivoting lever so as to maintain it, when the rotor has stopped, in a position where its first arm limits the lowering of a piece fast with the driven hinge of the corresponding blade, so as to limit droop of the latter. The two arms of the lever form an angle such that the centrifugal force, which is applied to the weight when the rotor rotates, tends to surmount the force of the spring and to cause said lever to pivot in a direction such that the stop of its first arm moves downwardly away from said piece fast with the corresponding blade, so as to retract the stop.

U.S. Pat. No. 2,465,674 describes independent lower stops for the different blades of the main rotor of a helicopter. Each lower stop is borne by a first lever mounted to pivot about a substantially horizontal pin, fixed to a plate forming the hub of the rotor. A weight is mounted to pivot about another horizontal pin, on a plate, itself sliding below said first plate, towards which it is pushed by a spring. A second lever, bearing this weight, is itself coupled to the first lever, bearing the stop, so as to cause said first lever to pivot, for a sufficient speed of the rotor, up to a position of retraction of the corresponding stop. During a lowering of the swashplate, serving to adjust the pitch of the different blades of the rotor, a vertical push member, actuated by the swashplate, pushes the sliding plate downwardly, compressing the corresponding spring, and this plate causes the first lever to pivot, so as to bring the corresponding stop into a position of service which the second lever bearing the weight also causes it to take when the speed of the rotor decreases. This system of stops is therefore very complicated and unreliable.

U.S. Pat. No. 4,368,006 also describes independent lower stops for the different blades of a rotor, each stop comprising two pendulum arms each mounted to pivot about a horizontal pin on a part, projecting radially outwardly, of the support of the drag axis of the corresponding blade. Each arm bears a weight at one of its ends and presents, at its other end, a rounded cam, centred on the pivot axis, and which engages, when the pendulum arm is returned into position by a spring, at low or zero speeds of the rotor, against a rounded bearing surface of complementary form of a pad fast with the structure of connection to the blade root, and which also presents an inclined ramp extending the bearing surface and adapted to prevent any jamming of the pad against the cam of the stop, in intermediate position, whilst in retracted position by the centrifugal force, a flat surface of the pad may come into abutment against a flat stop surface of the projecting part of the support of the drag axis. Each pendulum arm also presents two stops by each of which it comes into contact with one of two other stop surfaces of the projecting part of the support of the drag axis, in the two end positions of the pendulum arm.

All these different known embodiments have the drawback of not being favourably adaptable to hubs constituted essentially by two superposed plates perpendicular to the axis of rotation of the rotor, as they involve the presence of numerous added elements, presenting numerous stop surfaces, such as pins, pivot, levers, weights, springs, etc . . . disposed in complex, cumbersome and relative unreliable arrangements, projecting below the lower plate, which is unfavourable from the standpoint of aerodynamic drag, weight and cost.

Finally, the independent lower stops of the known embodiments presented hereinabove are inoperative for opposing the movements of the blades when, with the rotor stopped or at low speeds of rotation thereof, the blades are stressed upwardly by a strong gust of wind. In that case, the blade thus stressed may take a high coning angle and then fall back heavily on the lower stop, possibly causing deterioration of this lower stop and itself undergoing an instantaneous bending moment much greater than the loads which it can normally absorb, which may render it unserviceable.

In order to overcome this latter drawback, it has already been proposed, particularly by U.S. Pat. No. 3,147,810, to equip a rotorcraft rotor with independent lower and upper stops for the different blades, the embodiment of each of these lower and upper stops being similar to those described in the first two U.S. patents mentioned above. However, the adaptation of such an embodiment to a hub constituted essentially of plates doubles the complexity, weight and cost which characterize the embodiments comprising only independent lower stops.

Furthermore, U.S. Pat. No. 4,289,448 has already proposed an embodiment, which is also complex at the level of the independent upper stops, since each of the latter comprises a bell crank lever of which the first arm forms a stop and the second arm bears a weight, this lever being mounted to oscillate on a pivot fixed on the upper part of the hub of the rotor, parallel to the axis thereof, and near the axial plane of symmetry of the corresponding blade at rest, and this lever being urged by a spring which maintains it, when the rotor has stopped, in a position such that its first arm extends substantially parallel to the axial plane of symmetry of the blade, the two arms of the lever forming an angle such that the centrifugal force, which is applied to the weight when the rotor rotates, tends to surmount the force of the spring and to cause the lever to pivot in a direction such that the stop of its first arm moves away from the root of the blade. This embodiment is all the more complex as a member fixed on the upper part of the hub of the rotor is provided for absorbing the shock and the efforts received by the stop of each pivoting lever, this member being for example a ring fixed on the upper part of the hub, concentrically to the axis of the rotor, and arranged to support the pivots of all the levers. However, such an embodiment, which is complex at the level of the upper stops, is acceptable insofar as it is combined with a simple embodiment of the lower stops, which are constituted by a lower stop common for all the blades and of the type with droop restrainer ring. It is known that a drop restrainer ring constitutes a lower stop which is much simpler, less expensive and more reliable than independent lower stops for the different blades, but it has for a drawback that, if there is a gust of wind during the critical phases of spin-up or stop of the rotor, as often happens, particularly when a helicopter must land on or take off from an off-shore platform or a ship, in an environment where the wind is violent and eddying, the gust of wind strongly pushes one of the blades downwardly, which then abuts violently on the droop restrainer ring, with the result that the latter, not being subjected to sufficient reaction efforts from the other blades, takes an extreme position in which it does not prevent said blade, violently pushed downwardly, from reaching a dangerous position, of considerable inclination, and from possibly striking or even cutting the tail or cabin of the helicopter, by its end.

It is an object of the present invention to propose a device incorporating independent retractable stops, limiting the flapping movement of the blades downwardly and preferably also upwardly, which is well adapted to equipping hubs incorporating two plates, in particular of the type in which each blade is connected to the hub by a hinge device for which the three hinge axes of each blade intersect at one point, and which comprises a single spindle for connection to the plates and for retention of the corresponding blade.

One of the objects of the invention is to propose a device of the above type which is mechanically more compact, simpler and more robust than the known embodiments, whilst being less heavy and less expensive than the latter, and presenting a more reduced aerodynamic drag.

A further object of the invention is to propose a device incorporating retractable stops which is particularly advantageous when the device for hinging each blade to the hub is a laminated spherical bearing, in order to allow manoeuvre of the pitch of the blades, at low or zero speeds of the rotor, and to facilitate folding of the blades after the rotor has stopped, without damaging the laminated spherical bearings, and without necessitating any special tool for folding the blades, such as the one described for example in U.S. Pat. No. 4,268,222.

Yet another object of the invention is to propose a device incorporating retractable stops, offering an improved capacity of stopping and spin-up of the rotor when winds are strong, particularly for helicopters having to operate from ships or off-shore platforms, without presenting the drawback of the droop restrainer rings and without being as disadvantageous as the systems incorporating independent stops of the embodiments of the state of the art.

To this end, the device incorporating stops according to the invention, for limiting the flappings of the blades of the main rotor of a rotorcraft of the type presented hereinabove, i.e. comprising an upper plate and a lower plate, and coupled to the root of each blade of the rotor via at least one hinge device on which the flapping, drag and pitch-change axes of the corresponding blade intersect at one point, and which comprises one single pin for connection to the plates and for retention of the corresponding blade on the hub, is a device incorporating stops comprising, for each blade, an independent lower stop, constituted by a bearing member and a weight borne at the end of an arm of the bearing member, and mounted to pivot on the hub, as well as a lower bearing surface fast with the blade root or a connecting member connecting the blade root to the hinge device, and located beneath said blade root or said connecting member, the lower stop being subjected to the action of a return spring so that the position of the lower stop results from the equilibrium between the centrifugal force and the elastic return force of the spring, as a function of the speed of the rotor, and that, at low or zero speeds of the rotor, the spring returns the lower stop into a position of cooperation of the bearing member and of the lower bearing surface, in order to limit the flappings of the blade downwardly, whilst, at high speeds of the rotor, the centrifugal force retracts the lower stop against the spring by causing it to pivot, so that the bearing member does not oppose the downward flappings of the blade, and is characterized in that the bearing member is substantially in the form of a convex roller which presents a circular recess by which it is mounted to pivot about the axis of the single pin for retaining the corresponding blade on the hub, above the lower plate, and a part projecting outwardly with respect to the axis of the circular recess and at least partially delimited by a convex stop surface against which the lower bearing surface is intended to come into contact.

In order to be able to check whether the flight controls are in good condition, without damaging the lower stops, the device according to the invention is advantageously further characterized in that, on each lower stop, the convex stop surface extends, in a direction perpendicular to the axis of the retaining pin, over the whole pitch range of the corresponding blade, between two end positions which correspond, one to the minimum pitch obtained when the cyclic and collective pitches are minimum, and the other, to the maximum pitch obtained when the cyclic and collective pitches are maximum, and with the result that, for a mean pitch, obtained when the cyclic pitch is zero and the collective pitch small, and when the rotor has stopped, the contact between the lower bearing surface and the convex stop surface is made in an intermediate position so that, at low or zero speeds of the rotor, the contact between the bearing surface and the convex stop surface is not broken when the inclination of the blade is modified by manoeuvring the flight controls. In fact, in that case, the bearing surface may drive the convex roller when the pitch of the blade is changed, and the roller may therefore move on either side of its position of equilibrium to cover the pitch range.

In order to constitute, at high speeds of the rotor, a downward end limiting stop for each blade, the projecting part of the corresponding bearing member extends, on one side of the surface of the convex stop, by a substantially rectilinear portion against which the corresponding lower bearing surface may abut when the corresponding blade tends to take too accentuated a negative angle risking bringing it into contact with the fuselage of the rotorcraft.

So that the convex stop surface of each bearing member can be adapted to the different angular displacements of the corresponding blade without being damaged, the stop surface is advantageously such that its intersection with a plane perpendicular to the axis of the corresponding pin or with a plane passing through the axis of this pin is substantially in the form of an arc of circle of which the centre lies on the pin axis side.

In a simple embodiment, each lower bearing surface presents a flat track for contact with the corresponding convex stop surface, this flat track being perpendicular to the pitch-change axis of the corresponding blade. However, it is also possible that each lower bearing surface presents a concave track for contact with the corresponding convex stop surface, the concave track in that case having a radius of curvature greater than that of the corresponding convex stop surface.

Each lower stop is dimensioned to be retracted by the centrifugal force preferably, when the speed of the rotor reaches substantially half the nominal speed of rotation.

In a preferred embodiment of the invention, which is intended for equipping a rotor of which the device for hinging each blade to the hub is a laminated spherical bearing comprising an inner radial rigid element, mobile with respect to the plates, and on which is retained a rigid loop continuously surrounding the laminated spherical bearing and fast with the resistant structure of the corresponding blade or with a connecting member rendered fast with the root of the corresponding blade, as well as an outer radial rigid element, fixed between the edges of the plates, in the manner of a spacer, and constituted by a sleeve of which the bore is traversed by the single connecting pin, about which the corresponding blade may be pivoted, the device incorporating retractable stops according to the invention is further characterized in that the bearing member of each lower stop is mounted to pivot by its circular recess about an anti-friction ring mounted with tight fit about the lower end of the corresponding sleeve and on which is hooked one end of the return spring of the lower stop.

This embodiment, which presents numerous advantages specified hereinbelow, is more particularly intended for use on hubs incorporating plates connected to the blades of the rotor by laminated spherical bearings directly integrated in the root of the blades, such as described in U.S. Pat. No. 4,504,193. However, it is also possible to use such an embodiment on hubs of which the two plates are connected by each laminated spherical bearing to a radial clevis for connection to the corresponding blade root, said clevis preferably being a twin-clevis and recessed in its part facing the hub to allow free passage of the bearing, as described in U.S. Pat. No. 4,304,525.

In these different hubs, the position of each blade in drag is determined, particularly at low or zero speeds of the rotor, by a strut for elastic return in drag with incorporated damping, preferably in the form of a member constituted by an alternate stack of metallic or composite rigid plates and of plates of a visco-elastic material with high deformation remanence and having its inner and outer ends each coupled by a swivel joint respectively to the hub and to the root of the corresponding blade, the centre of the swivel joint of the outer end being close to the flapping axis of the blade, which passes through the centre of the corresponding laminated spherical bearing.

Concerning the hubs, it is possible that the central barrel of the hub and the upper plate constitute a first metallic monobloc element fixed, for example, by a ring of bolts, to the lower plate itself constituting a second metallic monobloc element with the upper part of the rotor mast, but it is also possible that the central barrel of the hub, fast with the upper plate, is fixed, likewise by a ring of bolts, to the lower plate, itself fast with the upper part of the rotor mast. Finally, it is possible that, in accordance with U.S. Pat. No. 4,556,365, the hub comprises two plates made of composite materials and comprising a laminated central plate, constituted by a stack of layers of high-strength fiber fabrics, surrounded by a belt of rovings of high-strength fibers.

An important advantage of the embodiment according to the invention and set forth above is that, during folding of a blade, it is the assembly constituted by the blade, the laminated spherical bearing and the lower stop which pivots about the axis of the single pin for connection to the plates and for retention of the blade.

It is known that the laminated spherical bearings are made to work essentially in compression and that, during folding of a blade, a large component of the lateral effort is introduced into the alternate metallic and elastomer layers of the corresponding laminated bearing, and stresses these layers in shear, therefore under poor conditions. This drawback is eliminated in the device according to the invention, by reason of the general pivoting mentioned above about the pin retaining the blade, the latter remaining in abutment and moving, via the track of its lower bearing surface, on the convex stop surface of the lower stop.

In order to reduce the risks of damaging the rotor when, in stopped state or rotating at low speeds, it is subjected to violent gusts of wind, which may tend to raise the blades about their flapping axis, the device incorporating retractable stops according to the invention further comprises, for each blade, an independent upper stop, limiting the upward movement of said blade constituted by a bearing member and a weight borne at the end of an arm of the bearing member, and mounted to pivot on the hub, as well as an upper bearing surface fast with the blade root or a connecting member connecting the blade root to the hinge device, and located on said blade root or said connecting member, the upper stop being subjected to the action of a return spring so that its position results from the equilibrium between the centrifugal force and the elastic return force of the spring, as a function of the speed of rotation of the rotor, and that, at low or zero speeds of the rotor, the spring returns the upper stop into a position of cooperation of the bearing member and of the upper bearing surface, in order to limit upward flappings of the blade, whilst at high speeds of the rotor, the centrifugal force retracts the upper stop against the spring by causing it to pivot in order that the bearing member does not oppose the upward flappings of the blade.

By analogy with the embodiment of the lower stops, the bearing member of each upper stop preferably also presents the form substantially of a convex roller having a circular recess by which it is mounted to pivot about the axis of the single pin for retaining the blade on the hub, below the upper plate, and a part projecting outwardly with respect to the axis of the circular recess and at least partially delimited by a cylindrical stop surface centred on the axis of the pin, and against which the upper bearing surface is adapted to come into contact.

Such an embodiment of separate upper stops and lower stops hinged on the pin for retention of the blade is of simple and light design, and its advantage is that the upper and lower stops are all housed between the two plates, which is favourable to good compactness and transmission without deformations of the considerable bearing efforts. The principle of operation of the upper stops is identical to that of the lower stops, except that is is unnecessary to ensure continuity of the contact of the upper stops with the corresponding upper bearing surfaces, during the pitch movements of the blades, at low or zero speeds of the rotor. The role of the upper stops is to limit the amplitude of the movements of the blades, on the ground, during spin-up or stopping of the rotor.

In order to increase efficiency of the upper stops, each upper bearing surface preferably presents a flat track for contact with the corresponding cylindrical stop surface, said track being perpendicular to the pitch-change axis of the corresponding blade. Moreover, each upper stop is retracted by the centrifugal force when the speed reaches substantially one quarter of the nominal speed of rotation.

By analogy with the lower stops, the bearing member of each upper stop is preferably mounted to pivot, by its circular recess, about an anti-friction ring mounted with tight fit about the upper end of the sleeve and on which is hooked one end of the return spring of the corresponding upper stop.

However, according to a second embodiment, which is to be preferred, the device according to the invention further comprises, for each blade, a second lower weight mounted to pivot with respect to the hub about an axis perpendicular to the axis of the corresponding pin and to the pitch-change axis of the blade, and presenting a nose-shaped part facing the pin and which is engaged, at low or zero speeds of the rotor, in a notch presented by the corresponding lower bearing surface, on the side opposite the pin, under the effect of the elastic return exerted radially and inwardly by a second spring on the second weight displaced towards the lower bearing surface, in order to block the upward flappings of the blade, whilst at high speeds of the rotor, the second weight is retracted radially outwardly by the centrifugal force, which causes it to pivot against the second spring and disengages it from the lower bearing surface, with the result that it cannot oppose the upward flappings of the blade. This variant therefore presents a combined assembly of upper and lower stops mounted about the blade retention pin and regrouped at the base of the connection of the blade to the hub. In this variant, each second weight, which is integrated in the system constituted by the corresponding lower stop and lower bearing surface, is moved away, in flight, by the centrifugal force and enables the blade to disengage from its bearing on the convex roller of the corresponding lower stop, via the corresponding lower bearing surface. When the rotor has stopped, this second weight therefore serves as upper stop, by reason of its nose-shaped structure, in its upper part, which engages in the corresponding notch made in the face of the lower bearing surface which faces the blade. In this embodiment, the blade cannot escape upwardly under the action of the wind, even when the latter is violent and is blowing in gusts. The same applies upon spin-up or stopping of the rotor, respectively before or after the blade is subjected to a centrifugal force which outrides its weight.

Moreover, in order to allow the pitch movements of the blades, the notch of each lower bearing surface advantageously presents a concave profile of revolution about the pitch-change axis of the corresponding blade. When the lower bearing surface bears by its track against the convex stop surface, the nose-shaped element is preferably received with clearance in the corresponding notch, such small clearance allowing easier engagement and retraction of the nose-shaped element under the action of the centrifugal force.

In a preferred embodiment, the second weight is borne at the outer radial end of a clevis of which the two arms are pivoted on either side of a heel, projecting radially outwardly, presented by a ring surrounding, beneath the lower plate, the lower end of the corresponding pin, the second spring being a longitudinal extension coil spring, which extends between the two arms of the clevis and connects the second weight to the heel. In this case, the lower end of the pin preferably bears a widened retaining head, presenting a flat portion cooperating with a shoulder of the heel, in order to prevent any rotation of the pin.

Whether or not the upper stops are integrated with the lower stops, in order to give the device maximum efficiency under the effect of the centrifugal force, on the one hand, and to allow, on the other hand, free pivoting of the laminated spherical bearing during flapping of the corresponding blade, the position of the weight of each lower stop and/or possibly of each upper stop, with respect to the axis of the corresponding pin, is inclined by about 45° on the pitch-change axis of the corresponding blade and inwardly with respect to the axis of the pin.

Similarly, whatever the design adopted for the upper stops, each lower stop and/or possibly upper stop is elastically returned by a longitudinal coil extension spring extending substantially radially with respect to the axis of the pin, between the corresponding weight and a fixed anchoring point with respect to the hub, or by a spiral extension spring which surrounds the pin and is hooked by one end to the corresponding bearing member and by the other end to a fixed anchoring point with respect to the hub.

Finally, if each blade of the rotor comprises a pitch control lever in the form of a stirrup of which the arms extend transversely one above and the other below the blade root or the member for connection to the corresponding blade root, the corresponding lower bearing surface of the device according to the invention is preferably fixed to the lower face of the lower arm of the stirrup and the corresponding upper bearing surface is possibly fixed to the upper face of the upper arm of this stirrup.

The invention will be more readily understood on reading the following description with reference to the accompanying drawings, in which.

Figure 1:
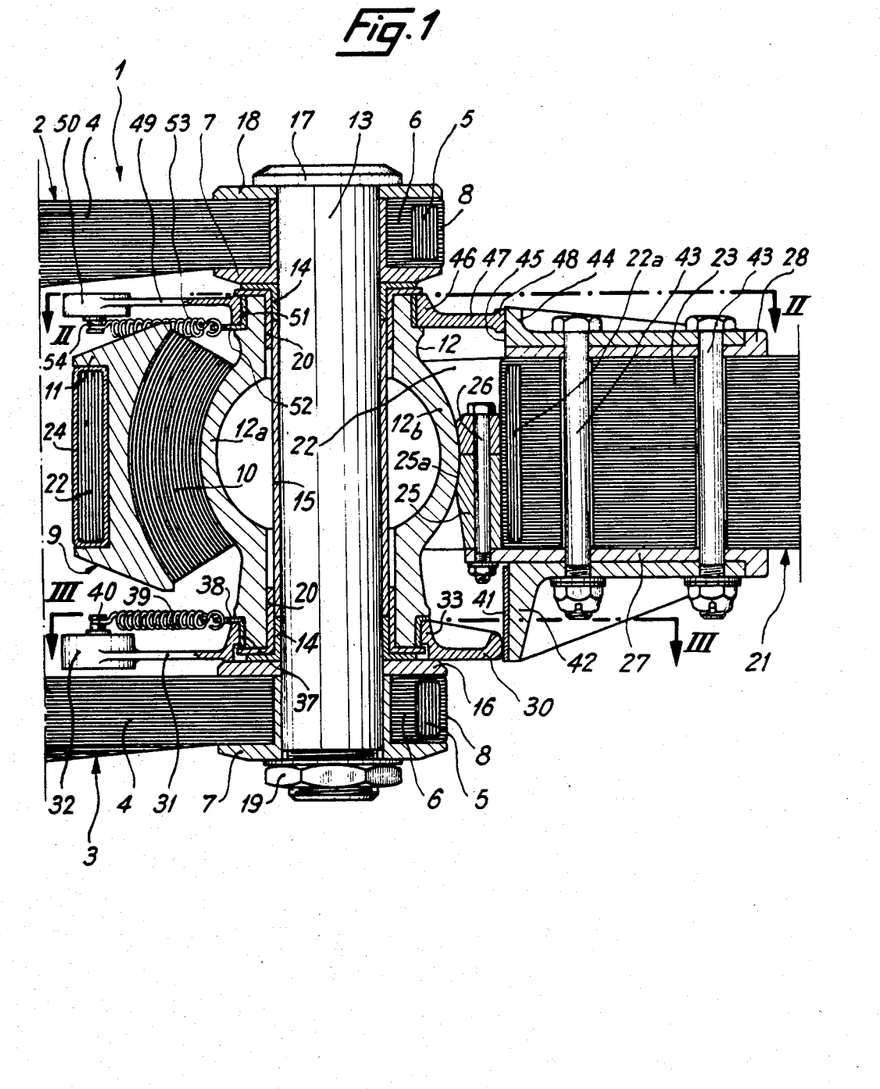
FIG. 1 shows a view in partial vertical section passing through the median plane of a blade of a rotor equipped with a first embodiment of a device incorporating retractable stops according to the invention.
Figure 2:
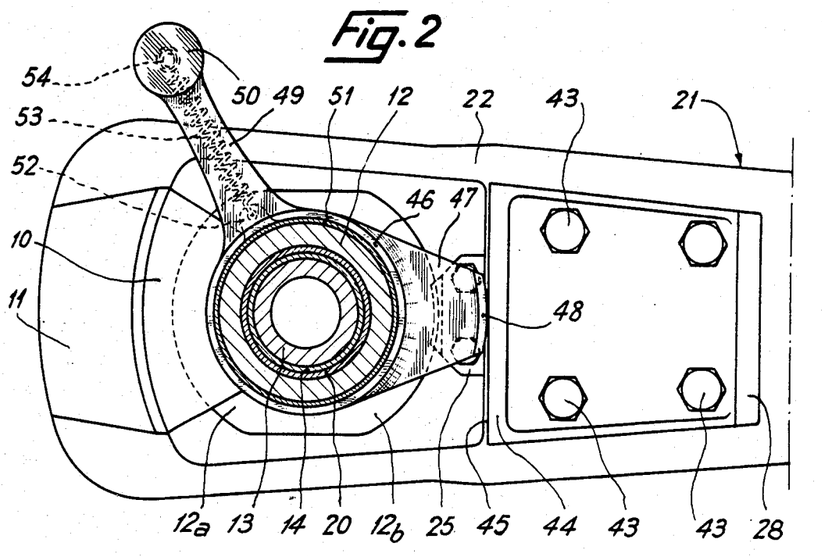
FIGS. 2 and 3 are views in partial transverse section of the rotor shown in FIG. 1, along lines II—II and III—III, respectively.
Figure 3:
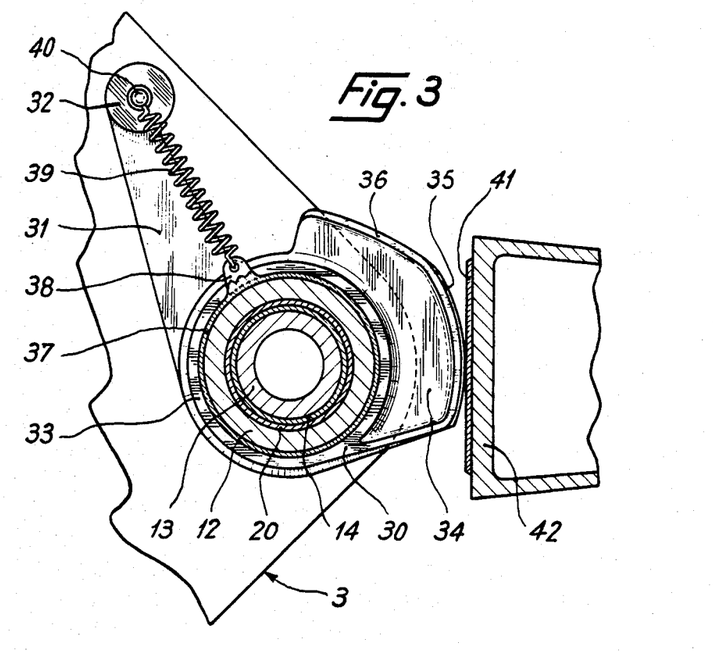

Referring now to the drawings, the structure of the helicopter rotor hub shown partially in FIGS. 1 to 3, as well as the structure of the blades of this rotor and the connection thereof to the hub are such as described in U.S. Pat. Nos. 4,556,365 and 4,504,193, respectively. It will simply be recalled that the hub shown in FIG. 1 essentially comprises three elements, which are a spacer (not shown), generally cylindrical in shape, in line with the rotor mast, and two identical plates of which one (2) is the upper plate and the other (3) the lower plate. The two plates 2 and 3 are fixed to the spacer in the manner described in U.S. Pat. No. 4,556,365, to which reference will advantageously be made for more details. Whilst the spacer and the members for fixing it to the two plates 2 and 3 are metallic elements, the two plates 2 and 3 are made of composite materials. Each plate 2 and 3 comprises a laminated central plate 4 constituted by a stack of layers of high-strength fiber fabrics and surrounded by a belt 5 of high-strength fiber rovings. Each central plate 4 is in the form of a star presenting as many arms as there are rotor blades. Moreover, each arm of the star-shaped central plate 4 is wider towards the central portion of the end plate 4 than towards its outer radial end 6, with flat upper and lower faces, which is advantageously widened and rounded and presents a bore in which a shouldered ring 7 is mounted. The belt of rovings, composed of carbon fibers for example, and which surrounds each central plate 4, is tightened against the edge of the arms of this central plate 4, being housed in outwardly open recesses in the edge of the outer radial ends 6 of each arm of the central plate 4, then the belt of rovings 5 is externally protected by an additional layer of fabric 8. As shown in FIG. 1, the identical upper and lower plates 2 and 3 respectively, extending in planes substantially perpendicular to the axis of rotation of the rotor, are disposed so that the respective arms of the two plates 2 and 3 are exactly superposed and that their shouldered rings 7 are coaxial.

A laminated spherical bearing, of a known type, performing the role of drag, flapping and pitch-change (for controlling the pitch) hinge simultaneously, and which is generally designated by 9, is mounted between the ends 6 of each pair of superposed arms of the two plates 2 and 3. The functions of the bearing 9 are well known: it takes up the centrifugal efforts and the radial efforts exerted on the blade to which it is connected, with small deformations, and it allows the angular pitch movements, with a limited elastic return, as well as the oscillations of flapping and drag of the blade. These characteristics result from the sandwich structure of the central part 10 of this bearing 9, constituted by an assembly of metallic cups, in spherical portions, alternating with thin layers of elastomer which presents a good fatigue holding and excellent quality of adherence to metals, two armatures, of which one (11) presents a concave spherical surface and the other (12) a convex spherical surface, being adhered by moulding to the central part 10 of the laminated spherical bearing 9. The armature 12, in outer radial position, and presenting the convex spherical surface, is constituted by a metallic sleeve whose outer wall presents two bulges 12a and 12b in the form of a recessed spherical cap, centred on the longitudinal axis of the blade. The sleeve 12 is placed between the ends of the superposed arms of the upper and lower plates 2 and 3, provided with their shouldered ring 7, and connects them to each other via a single spindle 13. This hollow metal spindle 13 passes through the rings 7 and an assembly of two shouldered anti-friction rings 14 and of a bush 15 forming spacer between the shoulder of the upper ring 7 and an anti-friction washer 16 resting on the end of the corresponding arm of the lower plate 3. This spindle 13 presents a widened flat head 17 retained against an anti-friction washer 18 resting against the end of the corresponding arm of the upper plate 2, by tightening a nut 19 screwed and preferably braked on the lower threaded end of the spindle 13 projecting beneath the lower plate 3. At the ends of the central bore of the sleeve 12, there are disposed shouldered anti-friction rings 20 mounted with tight fit therein and dimensioned so that their inner diameter presents a small clearance with respect to the outer diameter of the rings 14 and that the stack dimensions of the sleeve 12 and of the two shoulders of the rings 20 also presents a slight clearance with respect to the distance between the inner faces of the shoulder of the upper ring 7 and the lower washer 16.

This arrangement thus allows easy assembly and dismantling of the blade 21 on the hub 1 by a single spindle 13 and, if necessary, allows angular pivoting of the sleeve 12 about the axis of the spindle 13, without dismantling said spindle 13, in order to allow the corresponding blade 21 to be "folded".

The other armature 11, in inner radial position, of the laminated spherical bearing 9 is constituted by a metallic block substantially in the form of a truncated pyramid in the large base of which has been made the portion of concave spherical surface facing the spherical bulge 12a of the sleeve 12, and in the small base of which has been made a groove opening out on the lateral faces of the block 11 and facing the central spacer of the hub 1.

Each blade 21 of the rotor comprises rovings, of which each is preferably constituted by an assembly of basic yarns, of filaments or high-strength fibers coated and agglomerated in parallel to form a bundle by a hardened synthetic resin, and which constitute in the zone of the root of the blade 21 a continuous rigid loop 22 extending in the current part of the blade to progressively form the resistant spar, at the leading edge, as well as trailing edge elements. The two opposite parts of the roving loop 22 are separated from each other by a block 23 of a filling material, which defines with the end part of the roving loop 22 a free space constituting a housing for the laminated spherical bearing 9 which the roving loop 22 continuously surrounds, being housed in the groove of the inner armature 11, with interposition of layers of protecting fabrics 24 made of high-strength fibers, for example carbon fibers.

Between the bulge 12b of the sleeve 12 and the wall of the filling block 23 which is turned towards the axis of the rotor, and which, at this level, is preferably reinforced by some rovings 22a of the structure of the blade 21, there is disposed a two-part piece 25 presenting a concave spherical bearing surface 25a located opposite the bulge 12b. The piece 25 is fixed via two bolts 26 on the lower arm 27, extending transversely beneath the blade 21, of a lever controlling the pitch of this blade, in the form of a yoke of which the upper arm 28 also extends transversely but above the blade 21. The piece 25, in the form of a wedge, constitutes a device for maintaining and blocking the roving loop 22 in the groove bottom in the inner radial armature 11 of the bearing 9, mainly during spin-up and/or stopping of the rotor, accompanied or not by a gust of wind. The contact established between the bulge 12b of the sleeve 12 and the wedge 25 avoids untimely separation of the loop 22 from its housing and any detrimental effect which might result. Moreover, this arrangement facilitates assembly of the blade 21 and relieves the bearing 9 of part of the vertical shear stress due to the weight of the blade 21 when the latter is no longer under the effect of the centrifugal effort. Thanks to the passage around the inner armature 11 of the bearing 9 by the roving loop 22 of the blade 21, the latter, of which the root receives the bearing 9, may make all the necessary movements about the centre of this bearing 9 and the blade 21 may also pivot, for folding thereof, about the single spindle 13 which retains it on the hub 1 via the bearing 9. Finally, the pitch control lever of each blade 21, which is essentially constituted in the form of a yoke whose lower and upper arms 27 and 28 extend transversely, respectively below and above the two opposite parts of the roving loop 22 and the block of filling material 23 of the root of the blade 21, is connected on the one hand to the end of a pitch control rod and, on the other hand, to the outer end of a strut for elastic return in drag with incorporated damping, which is constituted in manner know per se by an alternate stack of rigid plates and of plates of a visco-elastic material with high deformation remanance, such as a silicon elastomer. The strut (not shown) which enables the blades to be driven in rotation and makes it possible to elastically oppose their oscillations in drag in the plane of the rotor, and which also acts as damper of these oscillations, as well as the pitch control rod (likewise not shown) are hinged on the pitch control lever by swivel joints.

The rotor which has just been described is virtually identical to those forming the subject matter of the U.S. Pat. Nos. 4,556,365 and 4,504,193 mentioned above. However, it differs from those hubs in that it comprises a device incorporating retractable stops limiting the flappings of the blades.

As shown in FIGS. 1 and 3, a lower stop constituted by a support or bearing member 30 in the form of a convex roller extending in an arm 31 bearing a weight 32 at its end, is mounted to pivot about the lower end of the sleeve 12, above the lower plate 3, and in abutment on the washer 16. The support member 30 presents a recess of circular section in a thick central part 33 which is fast with an eccentric part 34 projecting outwardly with respect to the axis of the circular recess. The eccentric part 34 is formed by a thin central web surrounded by a flange which, in its most projecting part, is defined by a convex outer surface 35. As shown in FIG. 3, the latter extends towards the weight 32 by a substantially flat or very slightly convex outer surface 36. The convex surface 35 is such that its intersection with a plane perpendicular to the axis of the recess or of the spindle 13 or with a plane passing through this axis is substantially an arc of circle centred on the side of this axis. By its recess, the support member 30 is mounted to rotate about a flanged anti-friction bush 37 which is fitted tightly about the lower cylindrical end of the sleeve 12. This bush 37 rests by its lower end against the shoulder of the ring 20, and its flange bears a boss 38 for hooking an end of a longitudinal coil draw spring 39 of which the other end is hooked on a central lug 40 borne on the substantially cylindrical weight 32. The lower stop assembly is thus produced and mounted so that at rest (FIG. 3), the spring 39 extends radially with respect to the axis of the spindle 13, along an axis inclined by about 45° on the pitch-change axis of the corresponding blade 21, and inwardly with respect to the axis of the spindle 13. The convex surface 35 constitutes a stop surface against which may abut the track 41, flat and perpendicular to the pitch-change axis of the corresponding blade 21 presented towards the spindle 13 by a lower bearing surface 42 of angle-iron section, fixed against the lower face of the lower arm 27 of the yoke-shaped pitch control lever by four bolts 43 which simultaneously ensure connection of the arms 27 and 28 of the lever to the blade 21 and fixation, on the upper face of the upper arm 28, of an upper bearing surface 44. This latter presents, towards the spindle 13, a track 45 likewise flat and perpendicular to the pitch-change axis of the blade 21, which is adapted to come into abutment against a cylindrical stop surface whose axis is that of the spindle 13, and presented by the thick and most projecting end 48 of an eccentric extension 47 of a support member 46 of an upper stop, which also comprises an arm 49 fast with the member 46 and bearing a weight 50. The bearing member 46 of the upper stop presents a recess of circular section, by which it is mounted to pivot about a flanged anti-friction bush or ring 51 which, by symmetry with the ring or bush 37 of the lower stop, is tightly fitted about the upper cylindrical end of the sleeve 12, and is in abutment by its upper end against the shoulder of the ring 20, with the result that the upper stop is mounted to pivot about the axis of the spindle 13, below the upper plate 2. The ring 51 presents a boss 52 for hooking one end of a longitudinal coil draw spring 53 of which the other end is hooked on a central lug 54 under the weight 50. As for the lower stop, at rest (FIG. 2), the spring 53 extends radially with respect to the axis of the spindle 13, along an axis inclined by about 45° on the pitch-change axis of the blade 21, and inwardly with respect to the axis of the spindle 13.

Figure 9:
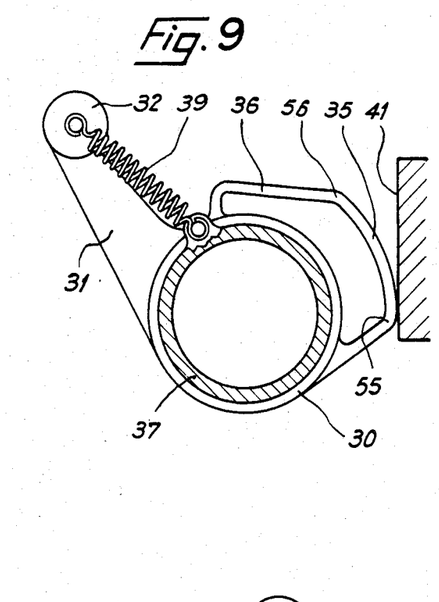
Figure 10:
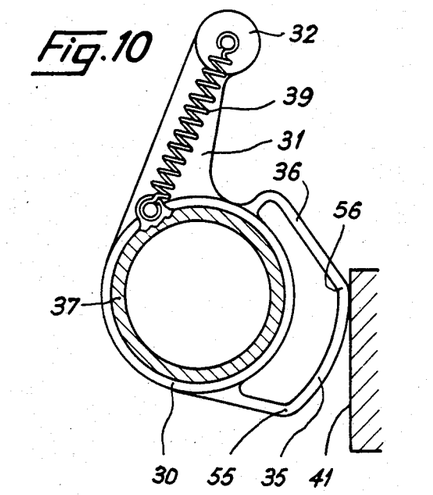
Figure 11:
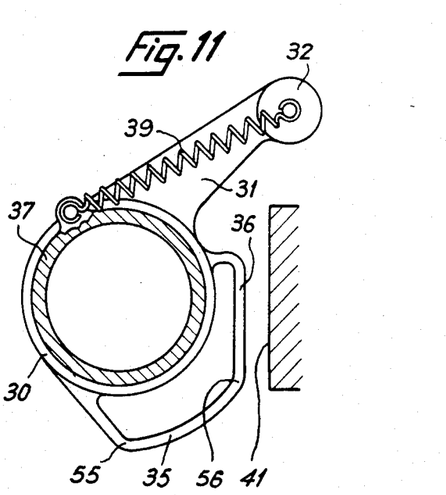

Operation of the device incorporating stops which has just been described will now be explained with reference to FIGS. 9 to 11 for the lower stops and to FIGS. 14 and 15 for the upper stops.

Figure 8:
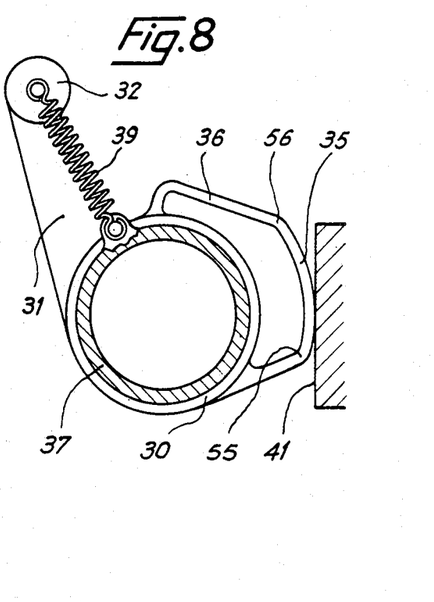
FIGS. 8 to 11 schematically represent in transverse section four different positions of a lower stop of the first embodiment according to the invention.
Figure 14:
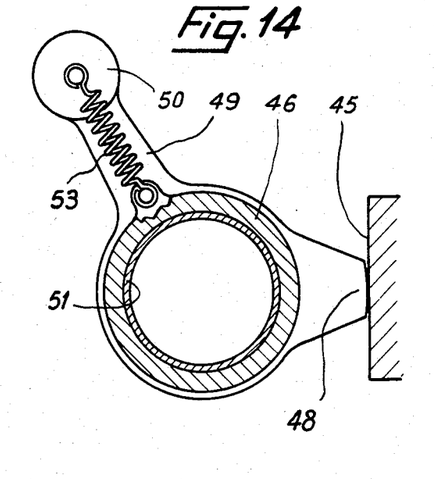
FIGS. 14 and 15 are Figures similar to FIGS. 12 and 13 for an upper stop returned by a longitudinal coil spring.
Figure 15:
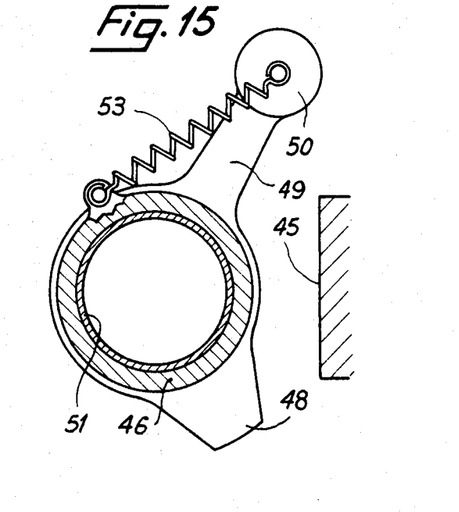

It will be understood that the lower and upper stops, mounted to pivot between the two plates 2 and 3 by their respective support member 30 and 46 about the spindle 13 for retaining the blade 21, are of the type retractable under the effect of the centrifugal force when the latter stresses their respective weight 32 and 50 against the respective return springs 39 and 53 which determine, at low or zero speeds of the rotor, the positions of the stops as shown respectively in FIGS. 3 and 8 for the lower stops and in FIGS. 2 and 14 for the upper stops.

When the rotor has stopped, the blade 21 is in abutment by the track 41 of its lower bearing surface, at pitch lever level, against the convex stop surface 35 of the lower stop which allows only a small downward flapping angle (about 1°) of the blade 21 under the effect of its own weight and possibly of a gust of wind, whilst, simultaneously, the upper stop is in position to oppose any upward flapping of a blade, due to a gust of wind which would immediately bring about bearing of the track 45 of the upper bearing surface 44 against the cylindrical stop surface 48 of the support member 46. When the rotor has stopped, the pitch-change of each blade normally corresponds to a mean pitch as the cyclic pitch is zero and the collective pitch is in low pitch position. The convex and cylindrical stop surfaces 35 and 48 respectively of the lower and upper stops are made so that, in this configuration of the blade 21, the support against the tracks 41 and 45 of the lower and upper bearing surfaces 42 and 44 respectively, is effected in intermediate position between the ends of the stop surfaces 35 and 48 in a direction perpendicular to the axis of the spindle 13. In fact, as the three centres of articulation of the blade 21 are located at the centre of the laminated spherical bearing 9, the lower stop is concerned not only by the flapping movements but also by the pitch and drag movements. As on the ground, the drag movements are negligible, as the position of the blade 21 is given by the strut for elastic return in drag, the pitch movements therefore determine the convex stop surface 35. Now, on the ground and with the rotor stopped, it is necessary to be able to manoeuvre the flight controls and to vary the pitch of the blades in order to effect adjustment of the flight controls and ensure that they are in good condition. In order to allow such adjustment and check, the convex stop surface 35 of the support member in the form of a convex roller 30 of the lower stop extends, in a direction perpendicular to the axis of the spindle 13, over the whole pitch range of the corresponding blade 21. This convex stop surface 35 is therefore in the form of a cam which extends between two ends 55 and 56 (cf. FIGS. 8 to 11) of which one, 55, on the side opposite the weight 32, is in contact with the track 41 of the blade 21 (FIG. 9), when the pitch of the latter is minimum, which corresponds to a minimum cyclic pitch (i.e. of maximum negative value) and a small collective pitch, whilst the other end, 56, on the weight 32 side, is in contact with the track 41 (FIG. 10) when the pitch of the blade 21 is maximum, which corresponds to a maximum positive cyclic pitch and to a high collective pitch.

The convex stop surface 35 therefore makes it possible to ensure the continuity of the contact between the lower stop and the track 41, on the ground, with the rotor stopped, when the flight controls are being manoeuvred to vary the pitch between these maximum and minimum values, and upon spin-up of the rotor, when the latter begins to rotate. During these phases, the support member 30, driven by the track 41, may pivot about the spindle 13, on either side of its intermediate position of equilibrium in which the spring 39 returns it, covering the pitch range, whilst remaining in abutment and moving over the track 41.

The cylindrical stop surface 48 of the upper stop does not extend, in a direction perpendicular to the spindle 13, to such a large extent as the convex stop surface 35, as it is not necessary to ensure a continuity of the contacts between the upper stop and the track 45 of the upper bearing surface 44, during the pitch movements, as the essential role of the upper stops is to limit upwardly, the amplitude of the movement of the blades, on the ground, when the rotor has stopped and upon spin-up thereof.

Upon spin-up of the rotor, the blades are stressed by the centrifugal force and tend to stretch radially, lifting from their abutment against the lower stops. When the speed of the rotor reaches one quarter of the nominal speed, the centrifugal force which stresses the weights 50 of the upper stops outweighs the return of the springs 53, so that the upper stops are retracted by rotation about the spindles 13. Each upper stop therefore passes from the position of FIG. 14 to that of FIG. 15. When the speed of the rotor reaches half the nominal speed, the centrifugal force which stresses the weights 32 of the lower stops outweighs the return of springs 39, with the result that the lower stops are in turn retracted by rotation about the spindles 13 and each lower stop takes the position of FIG. 11. The position of the weights 32 and 50 at 45° with respect to the pitch-change axis of the blades gives the stops maximum efficiency under the effect of the centrifugal force and allows free pivoting of the bearing 9 assembly when the blades flap. In flight, under the centrifugal effect and around the nominal speed of the rotor, the lower stops allow a downward flapping of the blades of the order of 7° to 8°. The position of the stops, as a function of the rotor speed, is then given by the equilibrium of the centrifugal efforts, acting in particular on the weights and the elastic return of the springs.

When the rotor stops, the lower stops are firstly returned into position for limitation of the downward flappings of the rotor, by springs 39, then the upper stops are returned into position for limitation of the upward flappings, by springs 53.

Figure 12:
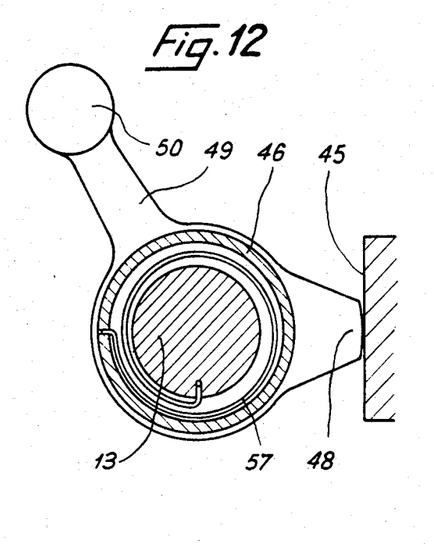
FIGS. 12 and 13 schematically show, in transverse section, the respective positions on the ground and in flight of an upper stop of the first embodiment according to the invention, returned by a spiral spring.
Figure 13:
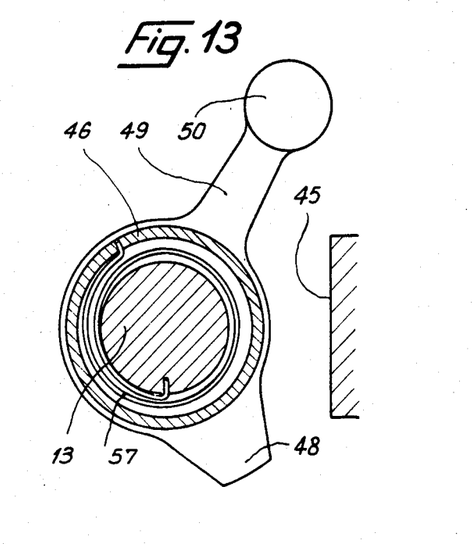

The coil draw springs 39 and 53 may be replaced by spiral springs such as spring 57 in FIGS. 12 and 13 on an upper stop. This spiral spring 57 surrounds the upper end of the sleeve 12 and is anchored by one curved end in a notch made in the support member 46, whilst its other curved end is anchored in a piece fast with the sleeve 12, for example a ring such as 51 in FIGS. 1 and 2.

The stop device described hereinabove is not only compact due to the arrangement of the lower and upper stops between the two plates of the hub, but it offers a considerable advantage of maintenance: during folding of a rotor blade towards the rear for example, the assembly constituted by the blade 21, the spherical bearing 9 and the corresponding lower stop is pivoted about the spindle 13. Folding is effected simply by blocking the blade in pitch-change, with the aid of a simple tool placed between the spindle 13 which is hollow and a point of fixation on the upper arm 28 of the corresponding pitch control lever, then by disengaging the strut for elastic return in drag and then rotating the blade through a suitable angle around the spindle 13.

Figure 4:
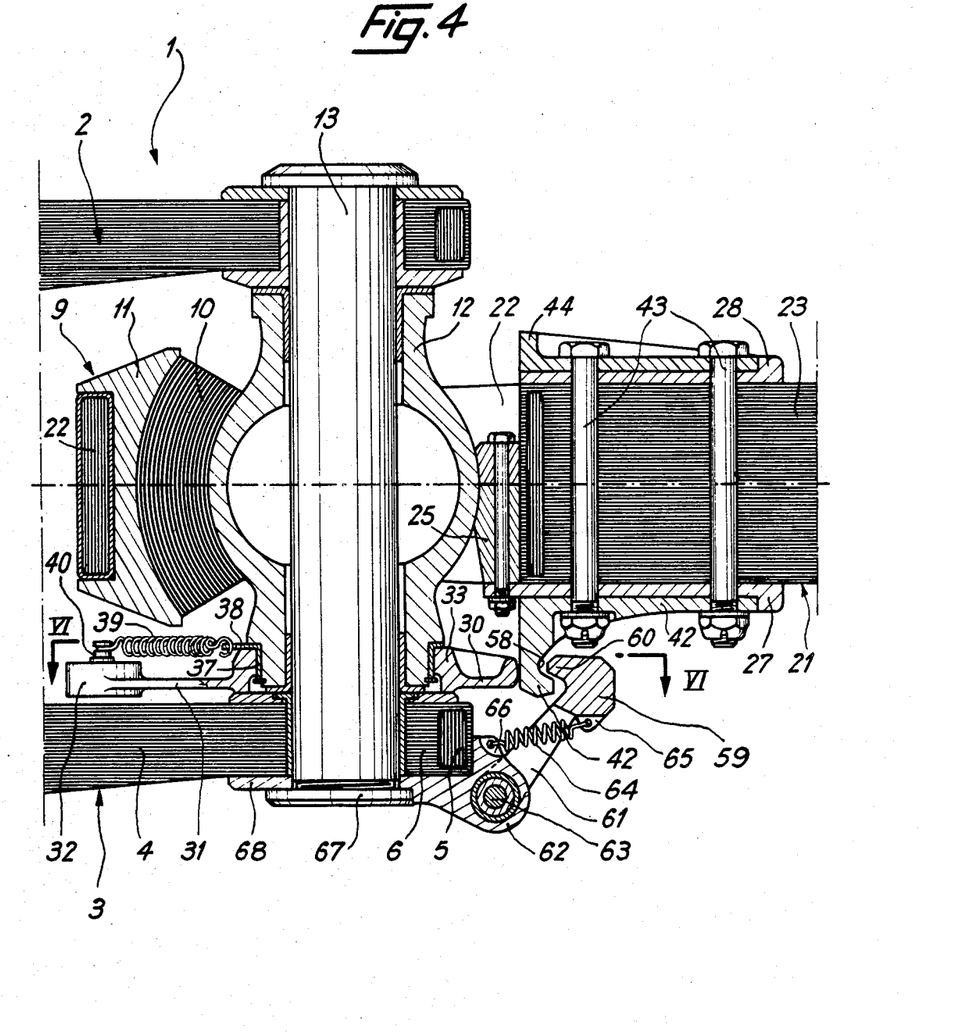
FIGS. 4 and 5 are views similar to FIG. 1 of a rotor hub equipped with a second embodiment of a device incorporating retractable stops according to the invention, in the positions occupied when stopped and in flight, respectively.
Figure 5:
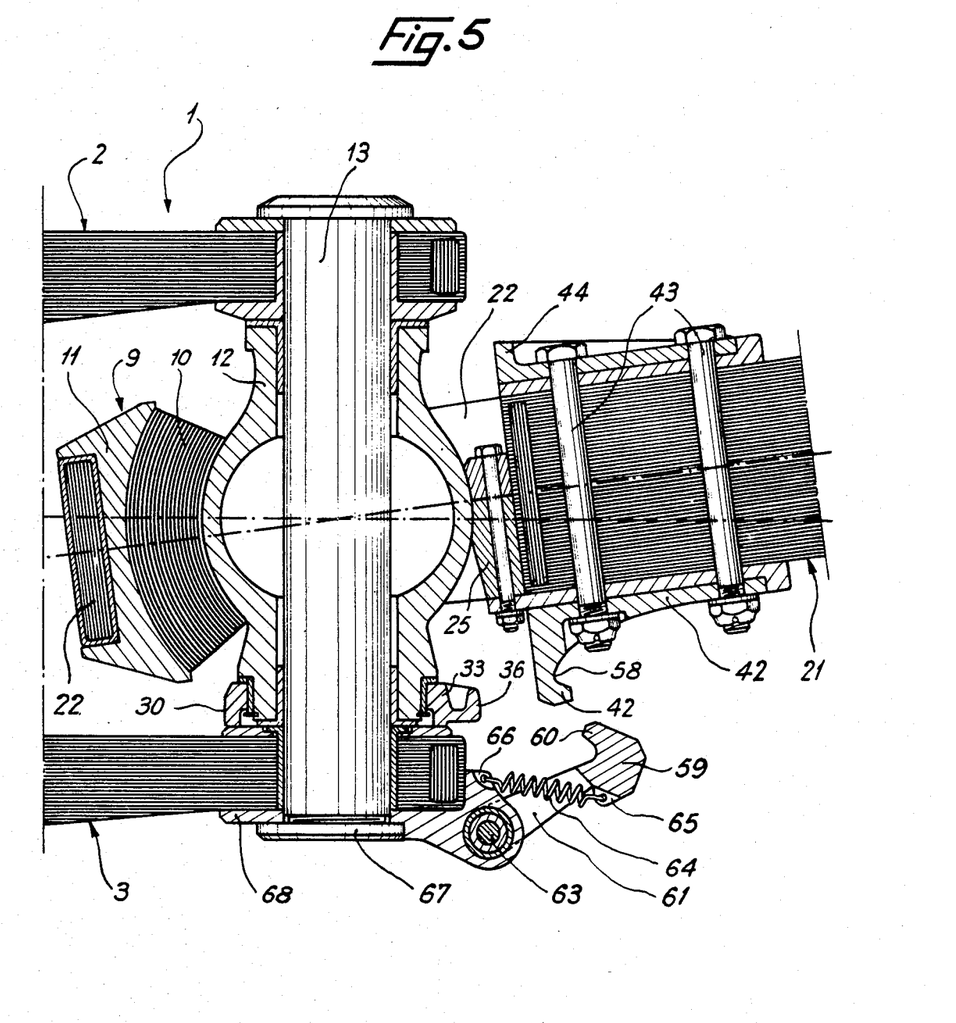
Figure 6:
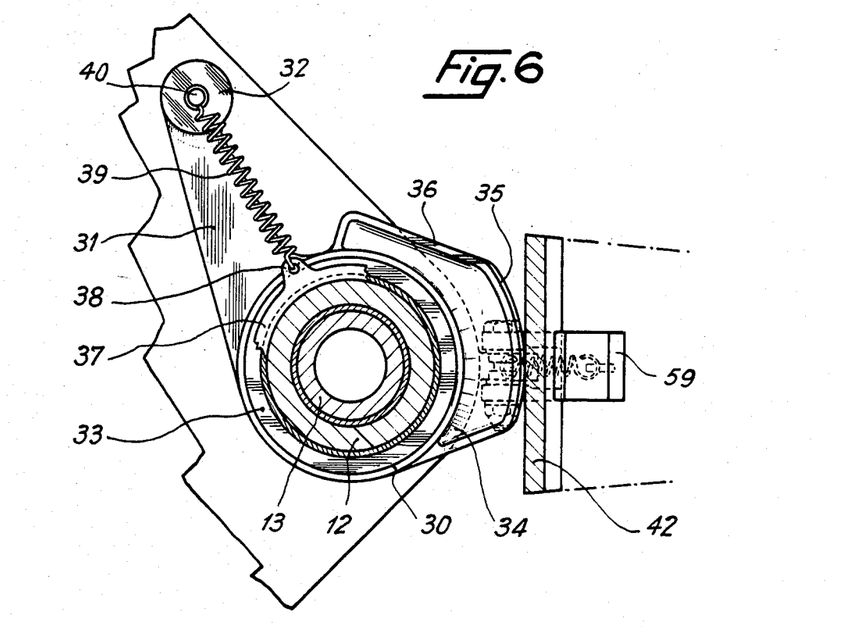
FIG. 6 is a view in section along VI—VI of FIG. 4.
Figure 7:
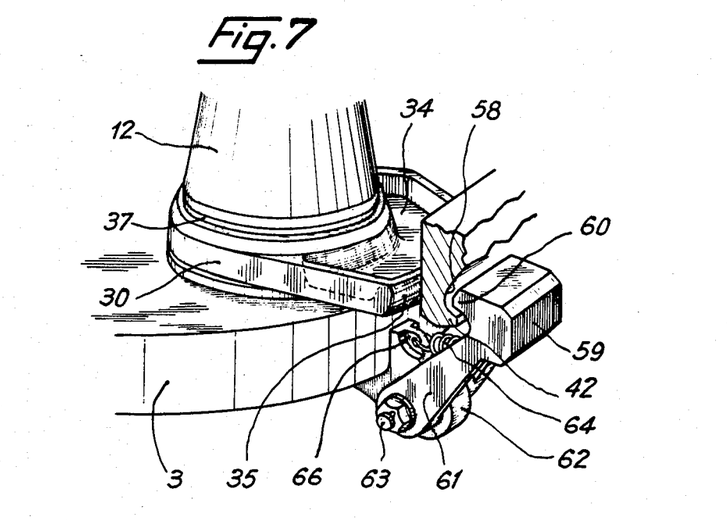
FIG. 7 is a view in perspective with section and parts torn away, representing a combined upper and lower stop of the second embodiment.
Figure 16:
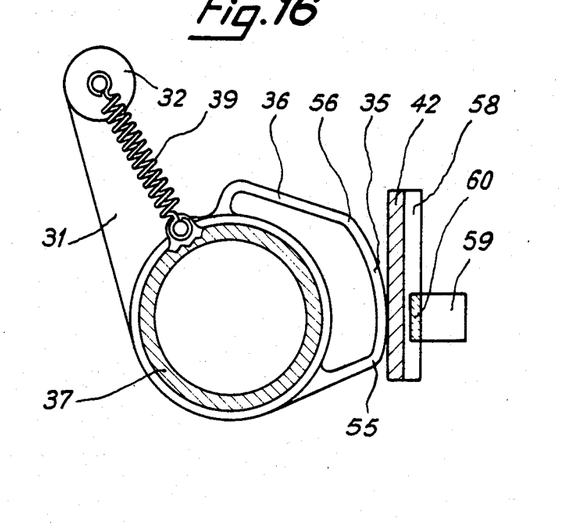
FIGS. 16 and 17 are schematic views in transverse section respectively showing the positions on the ground and in flight of a lower stop of the second embodiment according to the invention.
Figure 17:
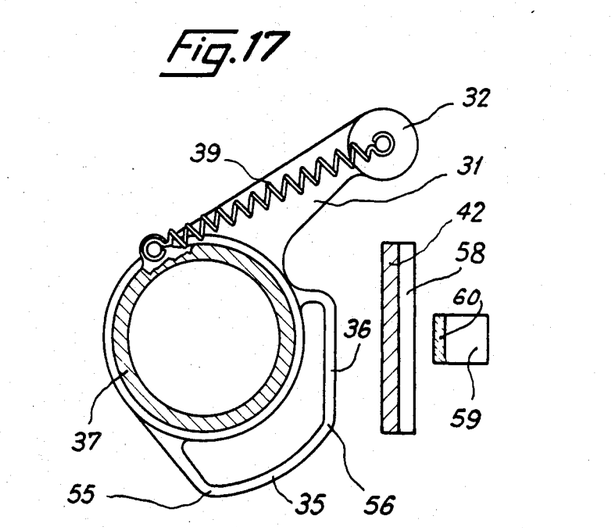

The rotor shown in FIGS. 4 to 7 presents numerous characteristics common with the one described with reference to FIGS. 1 to 3, and only the differences between these two embodiments will be mentioned. The rotor of FIGS. 4 to 7 is no longer equipped with a device incorporating separate lower and upper stops, but with a device in which a combined assembly is grouped at the base of the connection of each blade to the hub and performs the function of an upper stop and of a lower stop at the same time. There is therefore no more upper support member 46 bearing an upper weight 50 and presenting a cylindrical stop surface 48, and which pivots about the upper end of the sleeve 12 and cooperates with the track 45 of the upper bearing surface 44 of the blade 21. On the other hand, there is a lower stop identical to the one previously described, pivoting by the circular recess of its support member 30 (in the form of a convex roller presenting the convex stop surface 35) about the ring 37 tightened around the lower end of the sleeve 12, and of which the weight 32 at the end of the arm 31 is returned by the spring 39. The convex stop surface 35 is adapted to cooperate with the lower bearing surface 42 of the blade 21 in the same way as in the preceding example. However, in this example, the lower bearing surface 42 presents, on the side opposite its track facing the spindle 13, a notch 58 having a concave profile of revolution about the pitch-change axis of the blade 21. This notch 58 is adapted to cooperate with the nose-shaped end 60 of a second lower weight 59, shaped as a clevis mounted to pivot by its two arms 61 on either side of a heel 62. The latter, of rounded form, projects radially outwardly and downwardly with respect to the lower plate 3. The weight 59, which pivots about an axis 63, is retracted (FIG. 5) i.e. displaced radially outwardly and spaced apart from the lower bearing surface 42, in flight, by the centrifugal force, and it is returned radially inwardly (FIG. 4), at low or zero speeds of the rotor, by a draw spring 64 which passes between the arms 61 of the clevis and is hooked to a fastening 65 under the weight 59 and to a fastening 66 on the heel 62. On the ground, the weight 59 immobilizes the upward movement of the blade by engagement of its nose-shaped element 60 in the notch 58 of the lower bearing surface 42. The profile of revolution of the notch 58 allows the pitch movements of the blade 21 when the helcopter is on the ground. When the weight 59 is retracted, in flight, the blade 21 may "detach" from its abutment by the lower bearing surface 42 against the convex stop surface 35 of the lower stop, and as shown in FIGS. 5 and 17, the lower stop may then retract in turn by rotation of the support member 30 about the spindle 13. Inversely, when the speed of the rotor is reduced, the lower stop is firstly returned into position by spring 39, then the blade 21 pivots progressively downwardly, until it rests by its bearing surface 42 against the lower stop, and finally the spring 64 returns the weight 59 and engages the nose-shaped element 60 in the notch 58, with a small clearance which is shown in FIGS. 4 and 16. On the ground, with the rotor stopped or during spin-up or stopping of the rotor, the weight 59 therefore serves as upper stop which prevents the blade 21 from escaping under the action of a violent, continuous wind and/or of gusts of wind. The small clearance existing in this configuration between the nose-shaped element 60 and the notch 58 allows frank engagement and retraction of said nose in said notch. In this example, the spindle 13 presents a lower end with widened head 67 which is screwed in the main part of the spindle 13, and the widened head 67 presents a flat portion by which it is blocked in rotation in a recess machined in a washer 68 fast with the heel 62 and in abutment against the lower face of the lower plate 3. This second embodiment, also very compact and of simple design, has the advantage of procuring an appreciable gain in mass with respect to the first solution described hereinabove, and with respect to the known embodiments of the state of the art.

Moreover, when the blades are folded, the presence of the lower and upper stops combined beneath the laminated spherical bearings 9, together with the presence of the anti-recoil pieces 25 of the blades 21, makes it possible to avoid the laminated stops 9 being stressed in traction, which would be highly detrimental as these elements are designed to be stressed in compression. Otherwise, folding of a blade is effected as easily as in the preceding example, by overall rotation about the corresponding spindle 13.

What is claimed is:

1. A device incorporating retractable stops for limiting flapping of blades of a main rotor of a rotorcraft at low or zero speeds of the rotor, the rotor including plural blades, a hub having an upper plate and a lower plate, and at least one hinge device coupled to a root of each blade, an axis of flapping, an axis of drag, and an axis of pitch-change of the corresponding blade all intersecting at one point in the at least one hinge device associated with that blade, each at least one hinge device comprising one single pin for connection to the upper and lower plates and for retention of the corresponding blade on the hub;

said device incorporating stops including, for each blade, an independent lower stop comprising a bearing member having a circular recess by which it is coaxially pivotally mounted on said single pin for retaining the corresponding blade on the hub above said lower plate, an arm extending perpendicular to an axis of the circular recess, a weight mounted on an end of said arm, and a part extending outwardly with respect to said axis and at least partially delimited by a convex stop surface;

lower bearing surface fixedly associated with a root of the corresponding blade and located below the root; and a return spring biasingly connected between a stationary part of the at least one hinge device and said bearing member so that the position of the lower stop results from equilibrium between centrifugal force acting on the weight and elastic return force of the spring, as a function of the speed of the rotor, and that, at low or zero speeds of the rotor, the spring returns the lower stop into a position of contact of the convex stop surface and the lower bearing surface, in order to limit the flappings of the blade downwardly, whilst at high speed of the rotor, the centrifugal force retracts the lower stop against the elastic return force of spring by causing the bearing member to pivot, so that the bearing member does not oppose the downward flappings of the blade.

2. The device incorporating retractable stops of claim 1, wherein, on each lower stop, the convex stop surface extends, in a direction perpendicular to the axis of said single pin, over the whole pitch range of the corresponding blade, between two end positions which correspond, one to the minimum pitch obtained when the cyclic and collective pitches are minimum, and the other, to the maximum pitch obtained when the cyclic and collective pitches are maximum, whereby for a mean pitch, obtained when the cyclic pitch is zero and the collective pitch small, and when the rotor has stopped, the contact between the lower bearing surface and the convex stop surface is made in an intermediate position so that, at low or zero speeds of the rotor, the contact between the bearing surface and the convex stop surface is not broken when the angular position of the blade about its longitudinal axis is modified by manoeuvring the flight controls.

3. The device incorporating retractable stops of claim 2, wherein on one side of the convex stop surface, the projecting part of the corresponding bearing member extends by a substantially rectilinear portion against which the corresponding lower bearing surface abuts when the corresponding blade tends to take too large a negative flapping angle at high speeds of rotation of the rotor.

4. The device incorporating retractable stops of claim 1, wherein the convex stop surface is shaped such that its intersection with a plane perpendicular to the axis of the corresponding single pin or with a plane passing through the axis of this pin is substantially in the form of an arc of circle of which the centre lies on the pin axis side.

5. The device incorporating retractable stops of claim 1, wherein each lower bearing surface presents a flat track for contact with the corresponding convex stop surface, said track being perpendicular to the pitch-change axis of the corresponding blade.

6. The device incorporating retractable stops of claim 1, wherein each lower bearing surface presents a concave track for contact with the corresponding convex stop surface, said concave track having a radius of curvature greater than that of the corresponding convex stop surface.

7. The device incorporating retractable stops of claim 2, wherein the end of the convex stop surface which, in the end position corresponding to the maximum pitch, is in contact with the corresponding lower bearing surface, is shaped to be on the same side of the pitchchange axis of the corresponding blade as the weight, at low or zero speeds of the rotor.

8. The device incorporating retractable stops of claim 1, wherein said return spring is sized such that each lower stop is retracted by the centrifugal force when the speed of the rotor reaches substantially half the nominal speed of rotation.

9. The device incorporating retractable stops of claim 1, wherein the at least one hinge device for hinging each blade to the hub is a laminated spherical bearing comprising an inner radial rigid element, mobile with respect to the plates, and on which is retained a rigid loop continuously surrounding the laminated spherical bearing and fast with the resistant structure of the corresponding blade or with a connecting member rendered fast with the root of the corresponding blade, as well as an outer rigid element, fixed between the edges of the plates, in the manner of a spacer, and constituted by a sleeve of which the bore is traversed by the single pin, about which the corresponding blade may be pivoted and wherein the bearing member of the corresponding lower stop is mounted to pivot by its circular recess about a first anti-friction ring mounted with tight fit about the lower end of the sleeve and on which is hooked one end of the return spring of the lower stop.

10. The device incorporating retractable stops of claim 1, wherein it further includes, for each blade, an independent upper stop comprising a second bearing member having a second arm extending therefrom and a second weight borne at the end of the second arm, the second bearing member being mounted to pivot on the hub, ; an upper bearing surface fixedly associated with the blade root; and a second return spring biasingly connecting between said stationary part and said second bearing member so that the position of the upper stop results from equilibrium between centrifugal force acting on said second weight and the elastic return force of the second spring, as a function of the speed of rotation of the rotor, and that, at low or zero speeds of the rotor, the second spring returns the upper stop into a position of cooperation of the second bearing member and the upper bearing surface, in order to limit upward flappings of the blade, whilst at high speeds of the rotor, the centrifugal force retracts the upper stop against the elastic force of the second spring by causing the second bearing member to pivot in order that the second bearing member does not oppose the upward flappings of the blade.

11. The device incorporating retractable stops of claim 10, wherein each second bearing member of each upper stop has a circular recess by which it is mounted to pivot about the axis of the single pin for retaining the blade on the hub, below the upper plate, and a part projecting outwardly with respect to the axis of the circular recess and at least partially delimited by a cylindrical stop surface centred on the axis of the pin, and against which the upper bearing surface is adapted to come into contact.

12. The device incorporating retractable stops of claim 11, wherein each upper bearing surface presents a flat track for contact with the corresponding cylindrical stop surface, said track being perpendicular to the pitch-change axis of the corresponding blade.

13. The device incorporating retractable stops of claim 10, wherein said second spring is sized such that each upper stop is retracted by the centrifugal force when the speed of the rotor reaches substantially one quarter of the nominal speed rotation.

14. The device incorporating retractable stops of claim 9, wherein it further comprises, for each blade, an independent upper stop comprising a second bearing member having a second arm extending therefrom and a second weight borne at the end of the second arm, the second bearing member being mounted to pivot on the hub; an upper bearing surface fixedly associated with the blade root; and a second return spring biasingly connecting between said stationary part and said second bearing member so that the position of the upper stop results from equilibrium between centrifugal force acting on said second weight and the elastic return force of the second spring, as a function of the speed of rotation of the rotor, and that, at low or zero speeds of the rotor, the second spring returns the upper stop into a position of cooperation of the second bearing member and the upper bearing surface, in order to limit upward flappings of the blade, whilst at high speeds of the rotor, the centrifugal force retracts the upper stop against the elastic force of the second spring by causing the second bearing member to pivot in order that the second bearing member does not opposite the upward flappings of the blade, said second bearing member of the upper stop being shaped in the form substantially of a convex roller having a circular recess and each upper stop further comprises an antifriction ring mounted with tight fit about the upper end of the sleeve and on which is hooked one end of the second return spring of the upper stop.

15. The device incorporating retractable stops of claim 1, wherein it further comprises, for each blade, a second lower weight mounted to pivot with respect to the hub about the axis perpendicular to the axis of the corresponding pin and to the pitch-change axis of the blade, and having a nose-shaped part facing the pin a notch presented by the corresponding lower bearing surface, on the side oppposite the pin, engaged, at low or zero speeds of the rotor by the nose shaped part, a second spring on the second weight biasing said weight to engage the nose-shaped part in said notch in order to block the upward flappings of the blade, whilst at high speeds of the rotor, the second weight is retracted radially outwardly by centrifugal force, which causes it to pivot against the force of the second spring and disengages it from the lower bearing surface, in order not to oppose the upward flappings of the blade.

16. The device incorporating retractable stops of claim 15, wherein the notch of the lower bearing surface presents a concave profile of revolution about the pitch-change axis of the corresponding blade, in order to allow the pitch-change movements of the blade.

17. The device incorporating retractable stops of claim 15, wherein, when the lower bearing surface bears by its track against the convex stop surface, the nose-shaped element is received with clearance in the notch.

18. The device incorporating retractable stops of claim 15, wherein the second weight is borne at the outer radial end of a clevis of which the two arms are pivoted on either side of a heel, projecting radially outwardly, presented by a ring surrounding, beneath the lower plate, the lower end of the corresponding single pin, the second spring being a longitudinal extension coil spring, which extends between the two arms of the clevis and connects the second weight to the heel.

19. The device incorporating retractable stops of claim 18, wherein the lower end of the single pin bears a widened retaining head presenting a flat portion cooperating with a shoulder of the heel, in order to prevent any rotation of the pin.

20. The device incorporating retractable stops of claim 1, wherein, at low or zero speeds of the rotor, the position of the weight of each lower stop, with respect to the axis of the corresponding pin, is inclined by about 45° on the pitch-change axis of the corresponding blade and inwardly with respect to the axis of the pin.

21. The device incorporating retractable stops of claim 10, wherein, at low or zero speeds of the rotor, the position of the weight of each upper stop, with respect to the axis of the corresponding pin, is inclined by about 45° on the pitch-change axis of the corresponding blade and inwardly with respect to the axis of the pin.

22. The device incorporating retractable stops of claim 21, wherein said return spring and said second spring of each lower and upper stop are longitudinal coil extension springs extending substantially radially with respect to the axis of the pin between the corresponding weight and a fixed anchoring point with respect to the hub.

23. The device incorporating retractable stops of claim 21, wherein said return spring and said second spring of each lower and upper stop are spiral extension springs which surround said single pin and are hooked by one end to the corresponding bearing member and by the other end to a fixed anchoring point with respect to the hub.

24. The device incorporating retractable stops of claim 10, wherein each blade comprises a pitch control lever in the form of a stirrup of which the arms extend transversely one above and the other below the blade root, the corresponding lower bearing surface being fixed to the lower face of the lower arm and the corresponding upper bearing surface being fixed to the upper face of the upper arm of the lever.

25. The device incorporating retractable stops of claim 20, wherein the return spring of each lower stop is a longitudinal coil extension spring extending substantially radially with respect to the axis of the pin between the corresponding weight and a fixed anchoring point with respect to the hub.

26. The device incorporating retractable stops of claim 20, wherein the return spring of each lower stop is a spiral extension spring which surrounds the single pin and is hooked by one end to the corresponding bearing member and by the other end to a fixed anchoring point with respect to the hub.

27. The device incorporating retractable stops of claim 1, wherein each blade comprises a pitch control lever in the form of a stirrup of which the arms extend transversely one above and the other below the blade root, the corresponding lower bearing surface being fixed to the lower face of the lower arm of the lever.

* * * * *